(12) United States Patent
Jamison et al.

(10) Patent No.: US 10,941,654 B2
(45) Date of Patent: Mar. 9, 2021

(54) MEASURING FLUID PROPERTIES BASED ON FLUID SURFACE RESPONSE TO A DISTURBANCE

(71) Applicant: Halliburton Energy Services, Inc., Houston, TX (US)

(72) Inventors: Dale E. Jamison, Humble, TX (US); Li Gao, Katy, TX (US); Michael T. Pelletier, Houston, TX (US); Andreas Ellmauthaler, Rio de Janeiro (BR)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/323,714

(22) PCT Filed: Sep. 12, 2016

(86) PCT No.: PCT/US2016/051284
§ 371 (c)(1),
(2) Date: Feb. 6, 2019

(87) PCT Pub. No.: WO2018/048439
PCT Pub. Date: Mar. 15, 2018

(65) Prior Publication Data
US 2019/0203595 A1 Jul. 4, 2019

(51) Int. Cl.
*E21B 49/08* (2006.01)
*G01N 11/00* (2006.01)
(Continued)

(52) U.S. Cl.
CPC ............. *E21B 49/08* (2013.01); *E21B 47/00* (2013.01); *E21B 47/01* (2013.01); *E21B 49/00* (2013.01);
(Continued)

(58) Field of Classification Search
CPC .......... E21B 47/00; E21B 47/01; E21B 49/00; G01N 9/00; G01N 11/00; G01N 13/00
See application file for complete search history.

(56) References Cited

U.S. PATENT DOCUMENTS 4,512,183 A * 4/1985 Alexander ............. G01N 13/02
356/445
5,005,401 A    4/1991 Pierce et al.
(Continued)

FOREIGN PATENT DOCUMENTS

WO      2015126387      8/2015

OTHER PUBLICATIONS

Canadian Search Report for Application No. CA 3,028,956 dated Nov. 15, 2019.
(Continued)

*Primary Examiner* — Edward Park
(74) *Attorney, Agent, or Firm* — Tenley Krueger; C. Tumey Law Group PLLC

(57) ABSTRACT

Fluid properties like viscosity, yield strength, and density may be measured by analyzing fluid motion in response to disturbing the surface of the fluid. For example, a method may include disturbing a surface of a fluid in one or more locations, thereby forming a deformation and waves at the surface of the fluid for the one or more locations; imaging and measuring at least one selected from the group consisting of the deformation, the waves, and a combination thereof; and calculating a property of the fluid based on the at least one selected from the group consisting of the deformation, the waves, and a combination thereof, the property selected from the group consisting of viscosity, yield strength, density, and any combination thereof.

20 Claims, 10 Drawing Sheets

(51) Int. Cl.
*G01N 9/00* (2006.01)
*G01N 13/00* (2006.01)
*E21B 47/00* (2012.01)
*E21B 49/00* (2006.01)
*E21B 47/01* (2012.01)

(52) U.S. Cl.
CPC ............... *G01N 9/00* (2013.01); *G01N 11/00* (2013.01); *G01N 13/00* (2013.01); *E21B 49/0875* (2020.05); *G01N 2011/008* (2013.01)

(56) References Cited

U.S. PATENT DOCUMENTS

| 2002/0080362 | A1 | 6/2002 | Behroozi | |
|---|---|---|---|---|
| 2005/0018882 | A1* | 1/2005 | Muste | G01F 23/292 382/107 |
| 2014/0166871 | A1* | 6/2014 | Jamison | E21B 47/00 250/254 |
| 2015/0330215 | A1 | 11/2015 | Jamison et al. | |

OTHER PUBLICATIONS

International Search Report and Written Opinion for PCT/US2016/051284 dated Sep. 12, 2016.

Richard B. Dorshow, "The Simultaneous Measurement of Interfacial Tension and Oil Viscosity at Reservoir Conditions for Prudhoe Bay Fluids by Surface Laser Light Scattering Spectroscopy", PSE 22633, SPE Advanced Technology Series, vol. 3, No. 1, 1995.

F Behroozi, "Fluid Viscosity and the Attenuation of the Surface Waves: A Derivation Based on Conservation of Energy", Eur. J. Phys. 25, 115-122 (2004).

Scharstein, Daniel, and Richard Szeliski, "A taxonomy and Evaluation of Dense Two-Frame Stereo Correspondence Algorithms", International Journal of Computer Vision 47.1-3 (2002): 7-42.

Hartley, Richard, and Andrew Zisserman, "Multiple View Geometry in Computer Vision", Cambridge University Press, 2003.

Benetazzo, Alvise, et al., "Offshore Stereo Measurements of Gravity Waves", Coastal Engineering 64 (2012): 127-138.

Gallego, Guillermo, et al, "A Variational Stereo Method for the Three-Dimensional Reconstruction of Ocean Waves", Geoscience and Remote Sensing, IEEE Transactions on 49.11 (2011): 4445-4457.

Benetazzo, Alvise, "Measurements of Short Water Waves Using Stereo Matched Image Sequences", Coastal Engineering 53.12 (2006): 1013-1032.

Sakaino, Hidetomo, "Fluid Motion Estimation Method Based on Physical Properties of Waves", Computer Vision and Pattern Recognition, 2008. CVPR 2008. IEEE Conference on. IEEE, 2008.

Corpetti, Thomas, Etienne Memin and Patrick Perez, "Dense Estimation of Fluid Flows", Pattern Analysis and Machine Intelligence, IEEE Transactions on 24.3 (2002): 365-380.

* cited by examiner

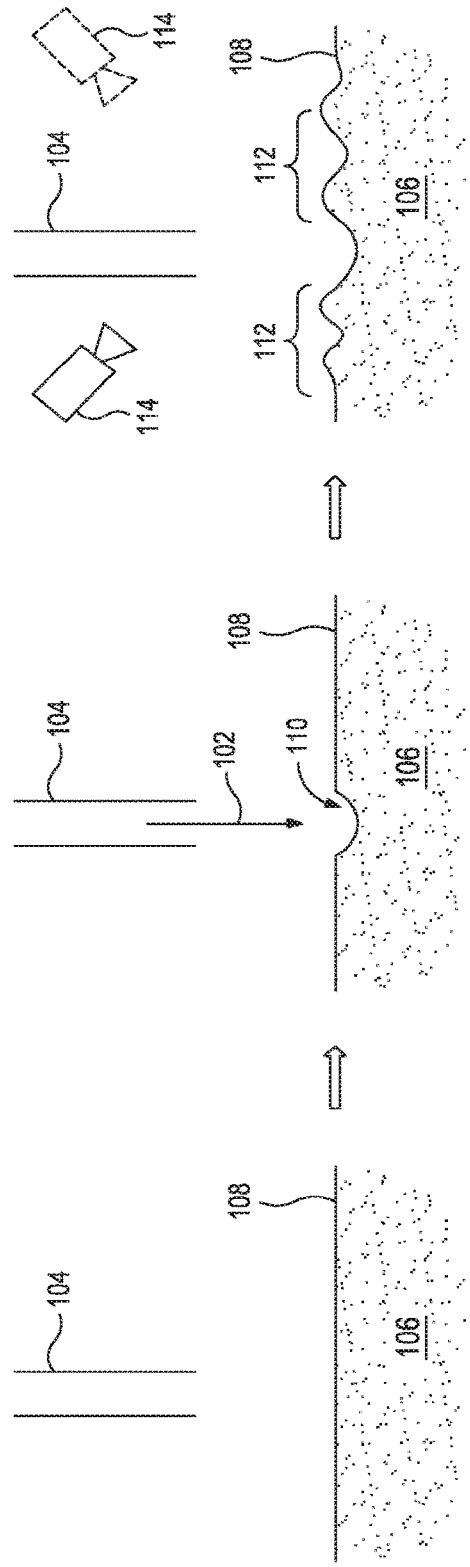
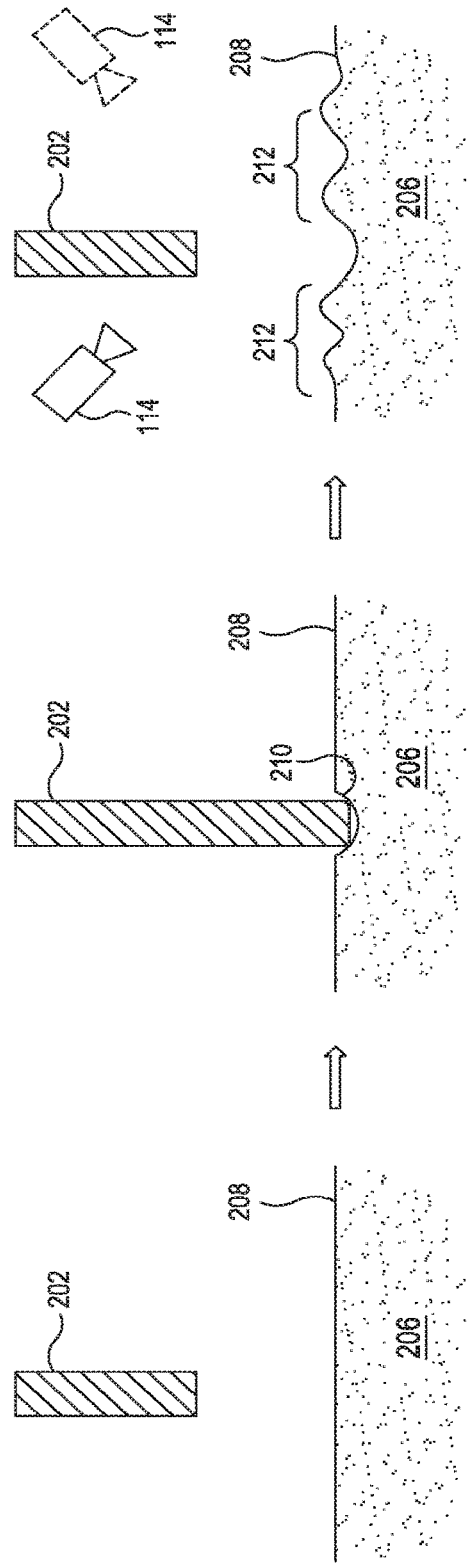

10,941,654 B2

MEASURING FLUID PROPERTIES BASED ON FLUID SURFACE RESPONSE TO A DISTURBANCE

BACKGROUND

The present application relates to measuring the properties of fluids.

When circulating a fluid through a wellbore during various downhole operations (e.g., drilling operations, stimulation operations, and cementing operations), the properties of the fluid (e.g., density and viscosity) effect the pump rate, the energy required for pumping, the efficacy of the operation, and the potential damage to the surrounding subterranean formation. To measure fluid properties, a sample is typically taken from the fluid and analyzed in a rheometer or other off-line equipment. The delay from sampling to analyzing also delays the operator in changing the composition of the fluid (e.g., adding weighting agent, diluting with base fluid, or adding viscosifier) to achieve the desired fluid properties for efficiently and effectively performing the downhole operation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 illustrates a method for disturbing the surface of a fluid.

FIG. 2 illustrates an alternative method for disturbing the surface of a fluid.

DETAILED DESCRIPTION

Figure 3:
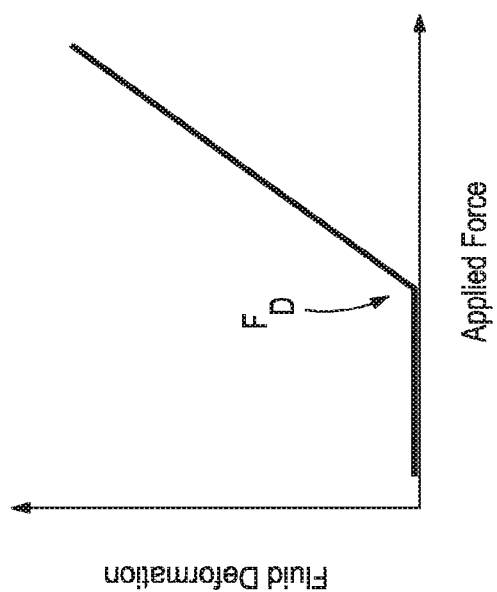
FIG. 3 illustrates is a plot of fluid deformation as a function of force applied where the force required to deform the surface of the fluid ($F_D$) is related to the yield stress of the fluid.

The present application relates to measuring the properties of fluids like viscosity, yield strength, and density by analyzing fluid motion in response to disturbing the surface of the fluid. More specifically, disturbing the surface produces a deformation and causes waves to propagate along the surface. By analyzing the fluid motion at the surface in response to specific disturbances, the fluid properties can be calculated. In some instances, this may be done while the fluid is flowing, thereby allowing for a real-time analysis of fluids during downhole operations.

FIGS. 1 and 2 illustrate methods for disturbing the surface of a fluid.

FIG. 1 uses a pressurized gas flow 102 to disturb the surface 108 of the fluid 106. A jet 104 or other similar device causes the pressurized gas flow 102 to impinge the surface 108 of the fluid 106, thereby creating the deformation 110. The deformation 110 then causes waves 112 to propagate along the surface 108 of the fluid 106. The deformation 110 and waves 112 may be imaged with one or more imaging, devices 114 (illustrated in FIG. 1 as a first and optionally a second imaging device). As described in more detail herein, analysis of the images of the deformation 110 and waves 112 may be used to determine fluid properties like viscosity, yield strength, and density.

FIG. 2 uses a solid object (illustrated as a piston 202 to disturb the surface 208 of the fluid 206. The piston 202 or other similar device impinges the surface 208 of the fluid 206, thereby creating the deformation 210. The deformation 210 then causes waves 212 to propagate along the surface 208 of the fluid 206. The deformation 210 and waves 212 may be imaged with one or more imaging devices 214. As described in more detail herein, analysis of the deformation 210 and waves 212 may be used to determine fluid properties like viscosity, yield strength, and density.

Figure 5:
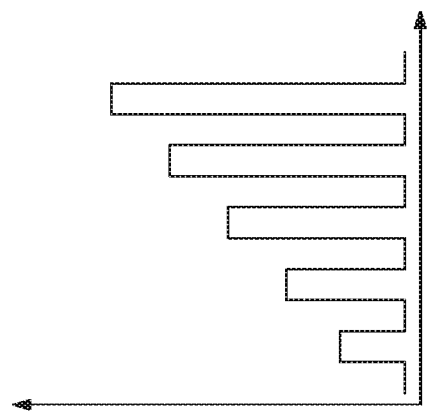
FIGS. 4-6 illustrate alternative embodiments of air jet pressure as a function of time that may be used when finding the $F_D$ of a fluid.
Figure 6:
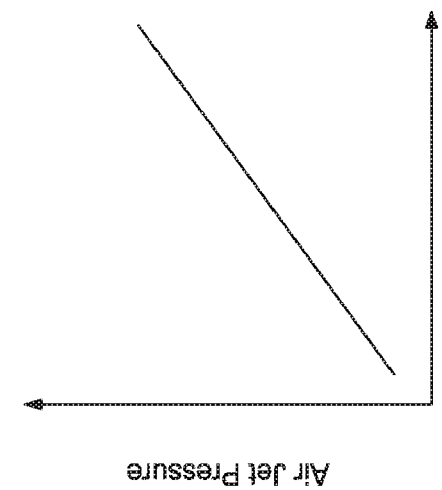
Figure 4:
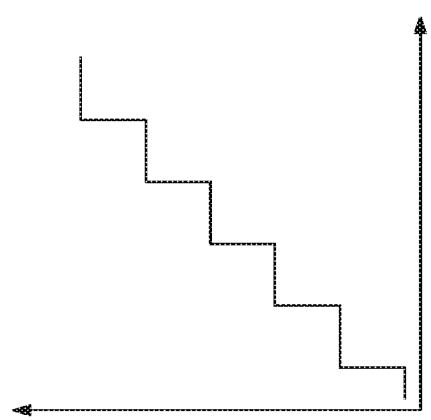

As illustrated in FIG. 3, the yield stress of the fluid is related to the force required to deform the surface of the fluid ($F_D$). For example, assuming a pipe of radius r is used to introduce pressurized gas close to the top of the fluid surface, further assuming that when fluid is deformed by the pressurized gas in case of the induced stress being greater than the yield strength of the fluid, the deformation is in the shape of a spherical surface, then one can write the deformation force as $F_D = \pi r^2 p$, where p is the gas pressure and r is the radius of the pipe. If the depth of the deformation is h, then the yield strength can be estimated to be $\sigma = pr/2h$. To determine $F_D$, the pressurized gas flow or solid object may impinge the fluid surface at different forces. For example, when using a pressurized gas flow (e.g., as illustrated in FIG. 1), a step-wise pressure change may be implemented (e.g., as illustrated in FIG. 4), a pulsed pressure change (e.g., with changing pulse pressures) may be implemented (e.g., as illustrated in FIG. 5), a continuous pressure change (e.g., with constant rate of change as illustrated or with variable rate of change) may be implemented (e.g., as illustrated in FIG. 6), or a combination thereof like a continuous, gradual pressure change between plateaus (e.g., a hybrid of FIGS. 4 and 6). In another example, when using a solid object (e.g., as illustrated in FIG. 2), pulsed impingement of different forces is applicable similar to the pulsed pressures illustrated in FIG. 4 because the deformation needs to be imaged and the solid object may impede imaging when in continuous contact with the surface.

Figure 7:
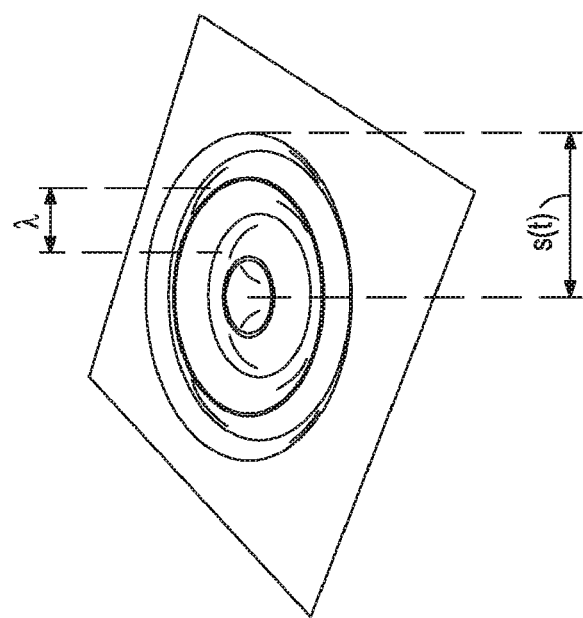
FIG. 7 illustrates the waves formed after disrupting the surface of a fluid.

FIG. 7 illustrates the waves formed after disrupting the surface of a fluid. As illustrated, the spread of the waves as a function of time (s(t)) extends from the center of the deformation to the last wave, and the wavelength (λ) is from the peak of one wave to the peak of an adjacent wave.

Figure 8:
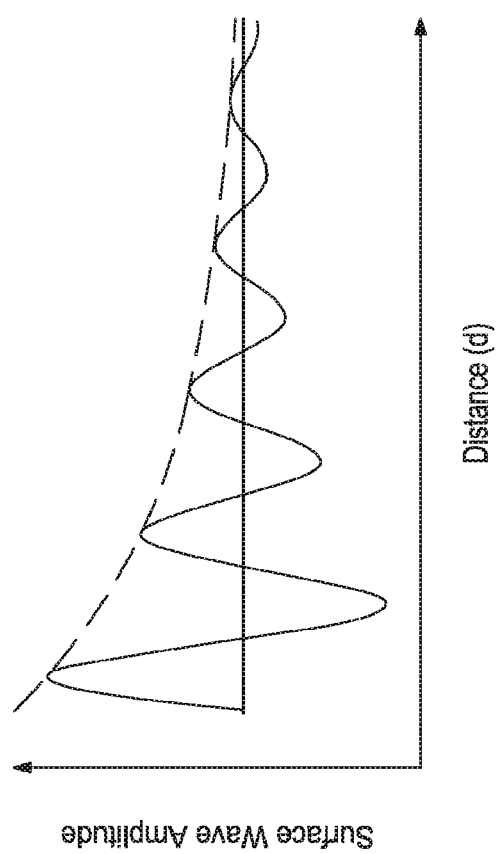
FIG. 8 is a graph of the spread of the waves.

FIG. 8 is a graph of the surface wave amplitude (A) illustrating the attenuation coefficient (α), or amplitude decay, of the waves. The dashed line that follows the decay of the wave peaks over the distance (d) of the spread of the waves can be expressed as Eq. 1, where the initial amplitude ($A_0$) is the amplitude of the wave at the source of deformation (i.e., d=0).

$$A = A_0 e^{-\alpha d} \qquad \text{Eq. 1}$$

The attenuation coefficient α is a function of the viscosity (μ) and can be determined through conventional calibration procedures using standard fluids of known viscosities. Once a is established, it may be parameterized and implemented into computer databases.

Figure 9:
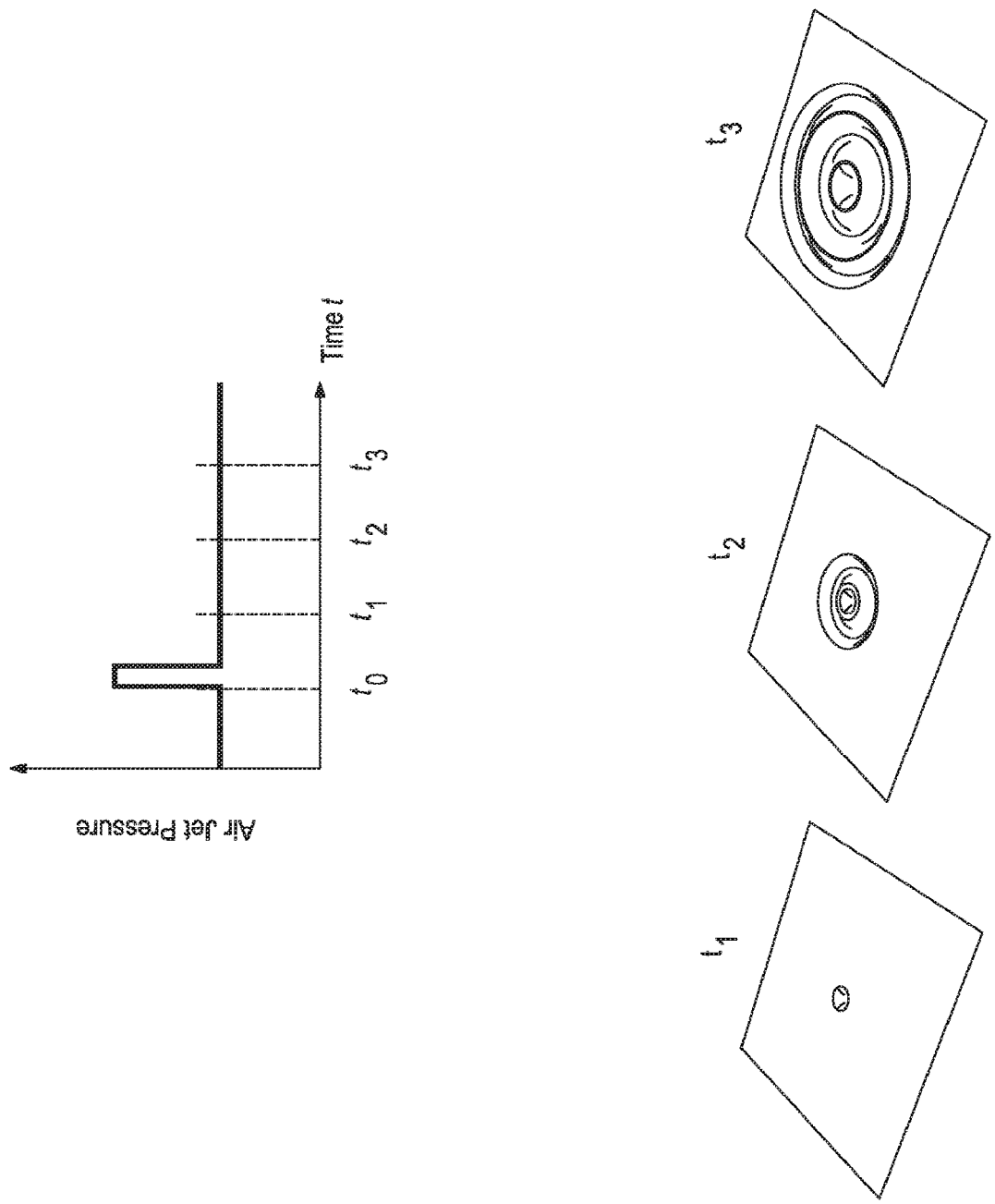
FIG. 9 illustrates an example of wave formation over time after a single disruption.

FIG. 9 illustrates an example of wave formation over time after a single disruption with either the pressurized gas flow or the solid object. As illustrated in the plot, a single pulse disruption is performed at time $t_0$. Then, the fluid surface is imaged at three time points $t_1$, $t_2$, and $t_3$. The viscosity of the fluid may be determined based on the wave attenuation at one or more of times $t_2$ and $t_3$ or any other point after waves begin forming. In some instances, the viscosity may be determined at several time points and then averaged.

Figure 10:
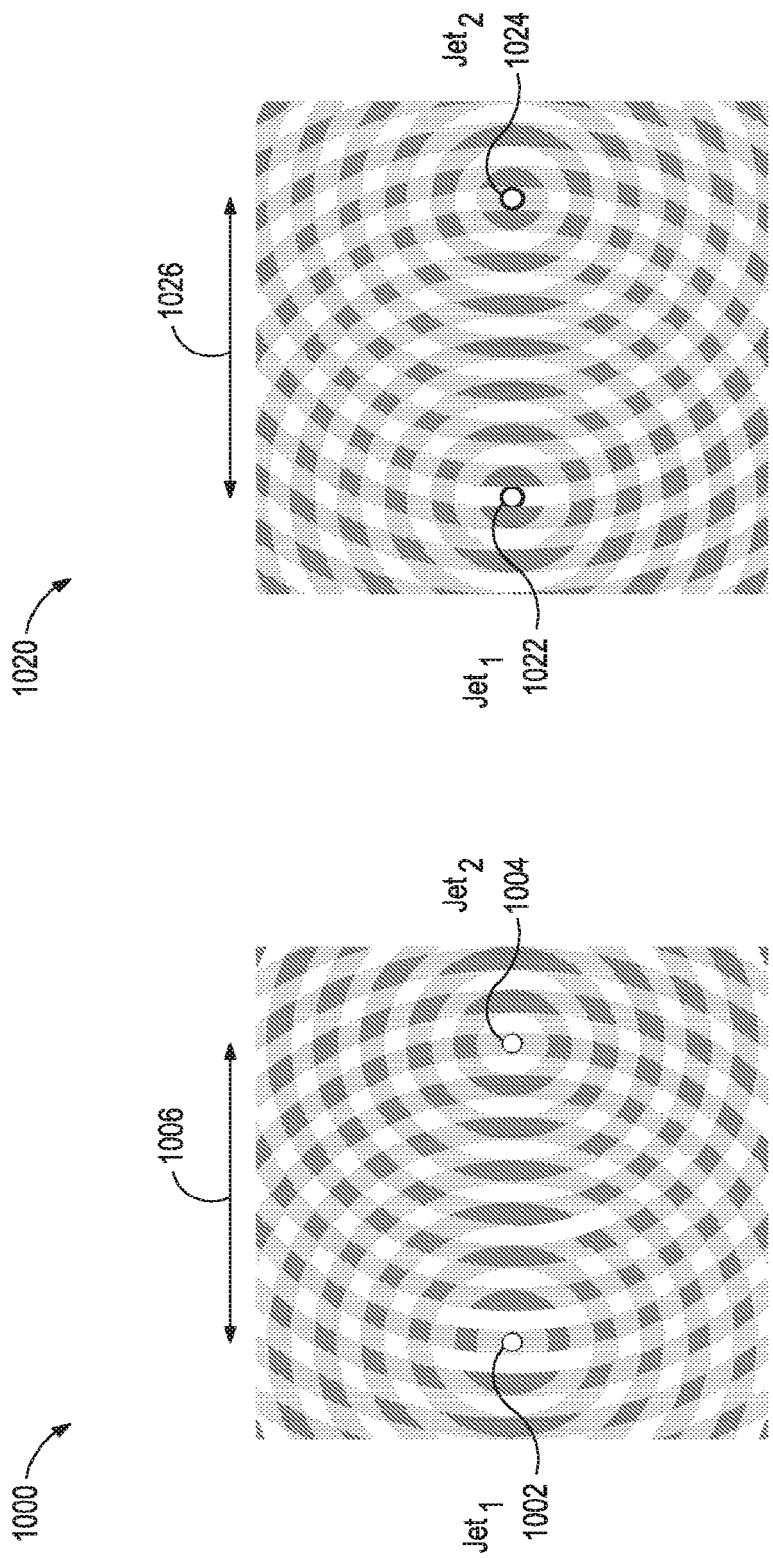
FIG. 10 illustrates two examples of forming standing waves that interfere using two disturbances.

FIG. 10 illustrates two examples 1000,1020 of forming standing waves that interfere using two disturbances 1002, 1004 and 1022,1024 on the surface, which may be an alternative method of determining the viscosity of the fluid. Both examples 1000,1020 use a continuous pressurized gas flow to create standing waves at different frequencies: 7 Hz for the first example 1000 and 9 Hz for the second example 1020. By creating the two disturbances 1002,1004 and 1022,1024 in phase with the same frequency, standing wave patterns are generated. The wavelength (λ) can be measured by counting the number of standing wave peaks or nodes (n) between the two disturbances 1002,1004 and 1022,1024 according to Eq. 2, where D is the distance 1006,1026 between the two disturbances 1002,1004 and 1022,1024.

$$\lambda = \frac{2D}{n} \quad \text{Eq. 2}$$

By changing the frequency (f) (continuously or pulsed), the dispersion relation of the waves can be quantified as the angular frequency (ω) according, to Eq. 3, where ω=2πf and the wave number (k) is k=2π/λ.

$$\omega = \omega(k) \quad \text{Eq. 3}$$

Then, the group velocity ($v_g$) of the wave can be quantified according to Eq. 4.

$$v_g = \frac{\partial \omega}{\partial k} \quad \text{Eq. 4}$$

Further, α is related to μ in this example according to Equation 5, further simplified to Eq. 6, where ρ is the specific gravity of the fluid.

$$\alpha = \frac{2k^2 \mu}{\rho v_g} \quad \text{Eq. 5}$$

$$\mu = \frac{\alpha \rho v_g}{2k^2} \quad \text{Eq. 6}$$

With knowledge of the ρ of the fluid, μ can be determined. Alternatively, μ can be determined according to the previous example using only one disturbance, and then, the ρ may be determined by this method.

As described previously, imaging may be performed with one or more imaging devices. Images of the deformation and waves may be a series of still images, a video, or the like. Exemplary imaging devices may include, but are not limited to, cameras (e.g., still cameras, high-speed cameras, light field cameras, video cameras, and the like), Lidar sensing devices, and the like, and any combination thereof.

Figure 11:
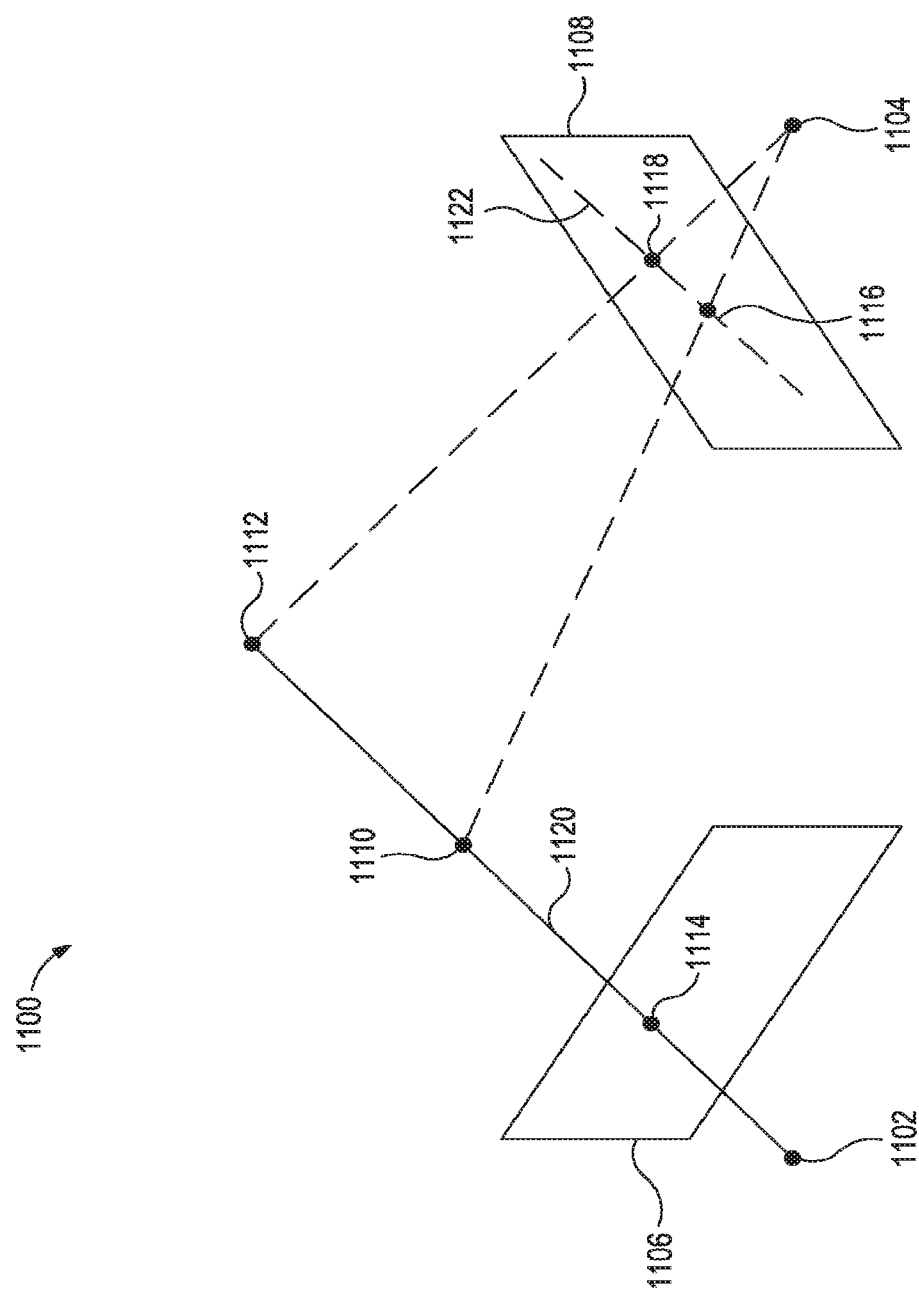
FIG. 11 illustrates implementation of two cameras using a stereoscopic vision approach.

FIG. 11 illustrates the implementation of a stereoscopic vision approach 1100 using two cameras 1102,1104. In some instances, this approach may be employed with more than two cameras. The stereoscopic vision approach allows for estimating 3-dimensional (depth) information from images taken from different vantage points, which is illustrated as two views 1106,1108 (also referred to as stereo views 1106,1108) for the two cameras 1102,1104, respectively.

In order to extract depth information from the two views 1106,1108 it is necessary to first establish the epipolar geometry between the two views 1106,1108. Suppose a homogeneous 3D scene point $X=[X\ Y\ Z\ 1]^T$ is imaged at a point $x=[x\ y\ 1]^T$ in the first view and at $x'=[x'y'1]^T$ in the second view. Then corresponding points x↔x' satisfy the following epipolar constraint of Eq. 7.

$$x'^T F x = 0 \quad \text{Eq. 7}$$

where F is the fundamental matrix of the camera pair, and T is the transpose operator.

The fundamental matrix is of rank 2, and, as a consequence, F does not provide point-to-point correspondences. Instead F specifies a map from a point in one image to its corresponding epipolar line in the other image. More specifically, as illustrated in FIG. 11, two physical points 1110,1112 (or any other physical point located on the line 1120 spanned by the two physical points 1110,1112) are imaged as a single image point 1114 in the first view 1106. In the second view 1108, the two physical points 1110,1112 are imaged as two distinct image points 1116,1118 spanning an epipolar line 1122 of the single image point 1114 of view 1106. The relationship between the single image point 1114 in the first view 1106 and the two image points 1116,1118 in the second view 1108 is governed by the fundamental matrix F of Eq. 7. For example, the fundamental matrix F may be computed using the underlying geometries of the stereo views 1106,1108 or by identifying a set of image point correspondences between the stereo views 1106,1108, among other techniques.

Then, after determining the relative positions of the stereo views 1106,1108 using epipolar geometry, the frames or images from each view 1106,1108 can be rectified. In some instances, the rectified images may have horizontal epipolar lines because they are row-aligned, which causes discrepancies between the images in the horizontal direction. These discrepancies may then be resolved using comprehensive taxonomy and fluid dynamics modeling.

Figure 12:
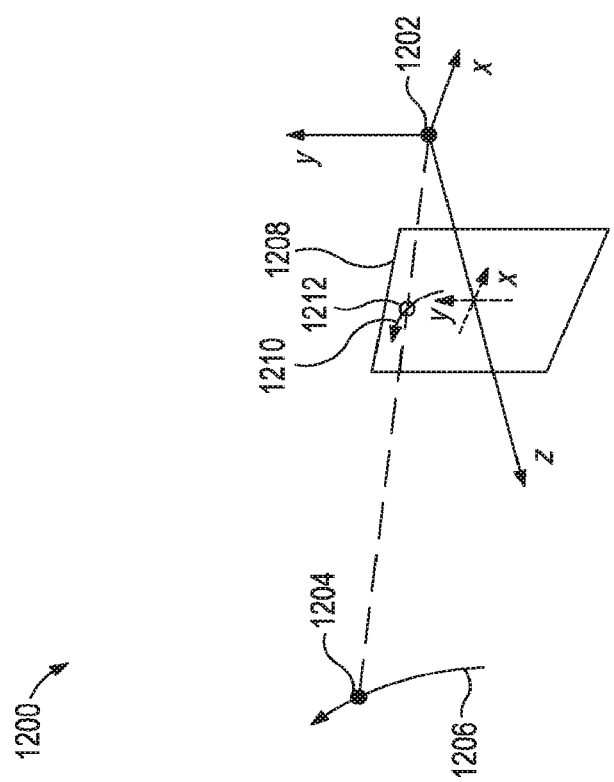
FIG. 12 illustrates implementation of one camera using an optical flow estimation technique.

FIG. 12 illustrates implementation of one camera 1202 using an optical flow estimation technique 1200. The optical flow estimation technique 1200 may alternatively be employed with two or more cameras where epipolar geometries are unknown. A point 1204 moving along an arbitrary 3-dimensional surface 1206 back-projects onto the view 1208 of the camera 1202 as a 2-dimensional path 1210 (also referred to as the "motion field") that can be expressed according to a location per Eq. 8 and instantaneous velocity per Eq. 9, where x(t) and y(t) are the coordinates of the point 1212 on the view 1208 at time t and T is the transpose operator.

$$\vec{x}(t) = (x(t), y(t))^T \quad \text{Eq. 8}$$

$$d\vec{x}(t)/d(t) \quad \text{Eq. 9}$$

The optical flow estimation technique 1200 computes an approximation of the motion field from time-varying image intensities such that Eq. 10 is satisfied, where $\nabla I=[I_x\ I_y]$ and $I_t$ denote spatial and temporal derivatives of the view I, respectively, and $\vec{u}=[u_1\ u_2]^T$ corresponds to the 2-deminsional velocity.

$$\nabla I(\vec{x},t)\cdot\vec{u}+I_t(\vec{x},t)=0 \qquad \text{Eq. 10}$$

Eq. 9 may be solved by a plurality of techniques including, but not limited to, iterative area-based regression (which impose smoothness constraints on the 2-dimensional motion), probabilistic motion estimators using maximum likelihood or Bayesian probabilities, and the like.

In some instances, the optical flow estimation technique 1200 may be further refined using fluid dynamics modeling.

Alternatively, a combination of the foregoing may be implemented where a motion field may be estimated from time-varying depth maps computed from a stereoscopic vision approach.

The foregoing methods and algorithms may be implemented with a flowing fluid or a static fluid. When the fluid is flowing, the fluid flow rate should be taken into consideration when analyzing the deformations and waves. For example, fluid dynamics modeling may be used to model a static fluid response using images taken with a flowing fluid.

The methods and algorithms described herein to determine fluid properties like viscosity, yield strength, and density may be implemented at a well site, in a laboratory, or the like on fluids like drilling muds, completion fluids, stimulations fluids, and the like. Further, the methods and algorithms described herein to determine fluid properties may be implemented in other oil and gas applications and locations (e.g., hydrocarbon transport through pipelines, hydrocarbon processing in refineries and petrochemical plants, and the like) and other industries (e.g., food production lines).

Figure 13:
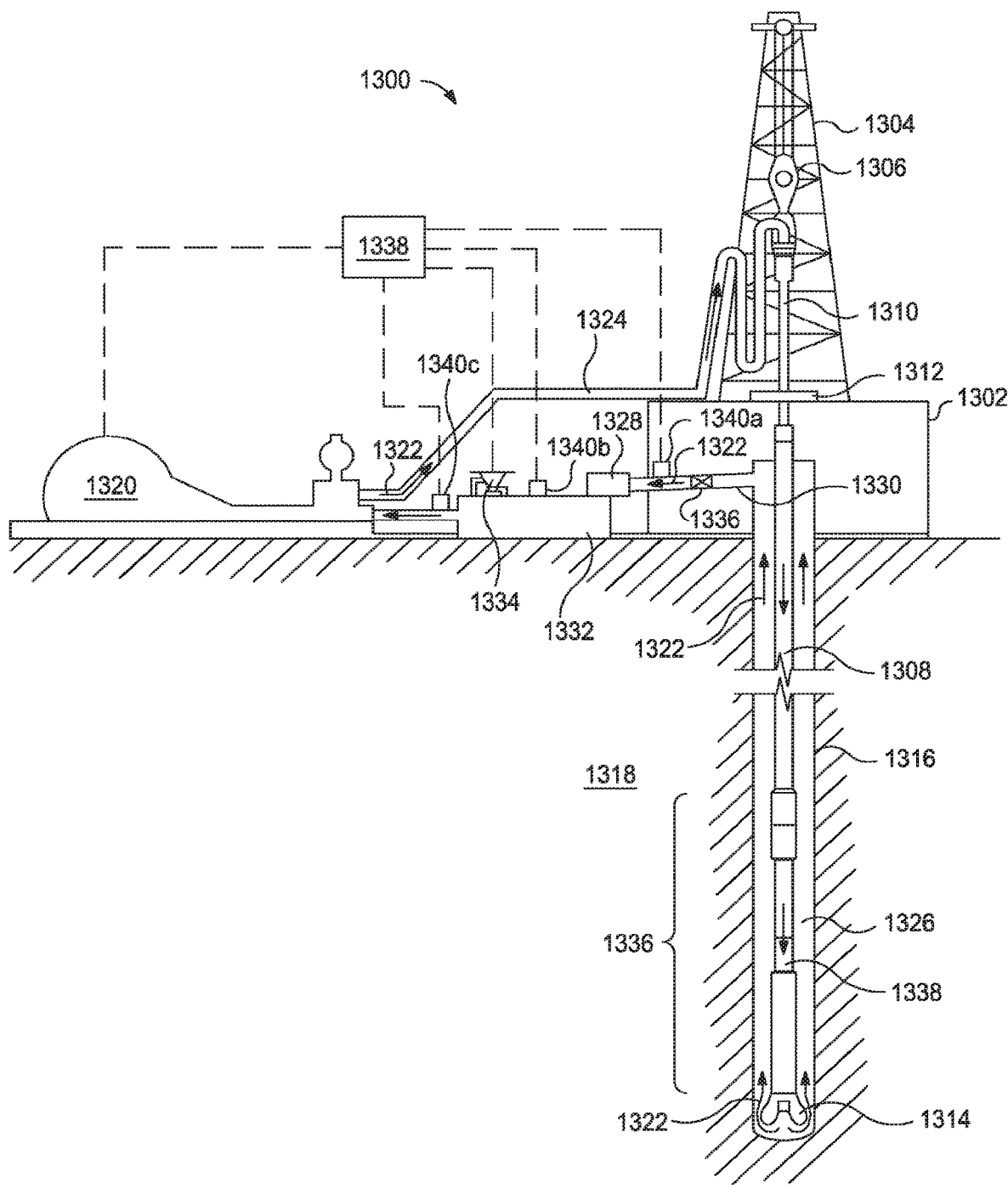
FIG. 13 illustrates an exemplary drilling system suitable for implementing the methods described herein.

For example, FIG. 13 illustrates an exemplary drilling system suitable for implementing the methods described herein. While FIG. 13 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 1300 may include a drilling platform 1302 that supports a derrick 1304 having a traveling block 1306 for raising and lowering a drill string 1308. The drill string 1308 may include, but is not limited to, drill pipe and coiled tubing, as generally known to those skilled in the art. A kelly 1310 supports the drill string 1308 as it is lowered through a rotary table 1312. A drill bit 1314 is attached to the distal end of the drill string 1308 and is driven either by a downhole motor and/or via rotation of the drill string 1308 from the well surface. As the bit 1314 rotates, it creates a wellbore 1316 that penetrates various subterranean formations 1318.

A pump 1320 (e.g., a mud pump) circulates mud 1322 through a feed pipe 1324 and to the kelly 1310, which conveys the mud 1322 downhole through the interior of the drill string 108 and through one or more orifices in the drill bit 1314. The mud 1322 is then circulated back to the surface via an annulus 1326 defined between the drill string 108 and the walls of the wellbore 1316. At the surface, the recirculated or spent mud 1322 exits the annulus 1326 and may be conveyed through chokes 1336 (also referred to as a choke manifold) to one or more mud cleaning unit(s) 1328 (e.g., a shaker, a centrifuge, a hydrocyclone, a separator (including magnetic and/or electrical separators), a desilter, a desander, a separator, a filter, a heat exchanger, any fluid reclamation equipment, and the like) via an interconnecting flow line 130. After passing through the mud cleaning unit(s) 1328, a "cleaned" mud 1322 is deposited into a nearby retention pit 1332 (e.g., a mud pit or mud tank). While illustrated as being arranged at the outlet of the wellbore 1316 via the annulus 1326, those skilled in the art will readily appreciate that the mud cleaning unit(s) 1328 may be arranged at any other location in the drilling assembly 1300 to facilitate its proper function, without departing from the scope of the disclosure.

At the retention pit 1332 (or before or after), the drilling system may include one or more mud treatment units. The mud 1322 may be treated to change its composition and properties. For example, weighting agents like barite may be added to the mud 1322 to increase its density. In another example, base fluid may be added to the mud 1322 to decrease its density. In the illustrated drilling system 1300, the addition of materials to the mud 1322 may be achieved with a mixer 1334 communicably coupled to or otherwise in fluid communication with the retention pit 1332. The mixer 1334 may include, but is not limited to, mixers, hoppers, and related mixing equipment known to those skilled in the art. In other embodiments, however, the materials may be added to the mud 1322 at any other location in the drilling assembly 1300. In at least one embodiment, for example, there could be more than one retention pit 1332, such as multiple retention pits 1332 in series. Moreover, the retention pit 1332 may be representative of one or more fluid storage facilities and/or units where the materials may be stored, reconditioned, and/or regulated until added to the mud 1322.

The drilling system 1300 may also include one or more fluid property determination components 1340 for performing the methods described herein. The fluid property determination components 1340 may include one or more fluid surface disruption components (e.g., pressurized air jets or solid objects as illustrated in FIGS. 1-2, respectively) and one or more imaging devices configured to image disturbances to the fluid surface produced by the fluid surface disruption components. The fluid property determination components 1340 may be configured to allow the mud 1322 or other fluid to flow through a chamber while the surface disruption occurs. Alternatively, the fluid property determination components 1340 may be configured to collect a portion of the mud 1322 and perform the surface disruption.

The fluid property determination components 1340 may be located in one or more locations along, the drilling system 1300. As illustrated, three fluid property determination components 1340a, 1340b, 1340c are located (1) between the chokes 1336 and the mud cleaning unit(s) 1328, (2) at the retention pits 1332, and (3) between the retention pits 1332 and the pump 1320, respectively. This configuration may allow measuring the properties of the mud 1322 exiting the wellbore 1316 with the fluid property determination component 1340a. Then, the amount of cleaning may be altered based on these properties. The properties of the cleaned mud 1322 may then be measured by fluid property determination component 1340b, which may be used to determine additives that should be added to the mud 1322 with the mixer 1334. Finally, the final mud 1322 properties may be measured with fluid property determination components 1340c and other drilling parameters like weight-on-bit, drill string and/or drill bit rotation speed, fluid flow rate, and the like may be manipulated to account for the properties of the mud 1322.

In some instances, the data (e.g., images) collected by the fluid property determination components 1340 may be transmitted to a control system 1338 for analysis. In some instances, one or more of the fluid property determination components 1340 may have control systems that analyze the images and then, report the fluid properties and/or transmit the fluid properties to the control system 1338 for comparison to the analysis of the other fluid property determination components 1340. Hybrids thereof may also be implemented.

The control system 1338 may be capable of executing the mathematical algorithms, methods, and drilling system control described herein. For example, the control system 1338 may be communicably coupled to not only receive data from the fluid property determination components 1340 but also transmit instructions to various components of the drilling system 1300 (e.g., pump 1320, mixer 1334, and the like) for changing drilling parameters or changing the composition of the mud 1322.

The various components of the drilling system 1300 may further include one or more sensors, gauges, pumps, compressors, and the like used store, monitor, regulate, convey, and/or recondition the exemplary muds 1322 (e.g., sensors and gauges to measure the composition and/or pressure of the mud, compressors to change the pressure of the mud, and the like).

While not specifically illustrated herein, the disclosed the disclosed drilling system 1300 may further include drill collars, mud motors, downhole motors and/or pumps associated with the drill string 1308, MWD/LWD tools and related telemetry equipment, sensors or distributed sensors associated with the drill string 1308, downhole heat exchangers, valves and corresponding actuation devices, tool seals, packers and other wellbore isolation devices or components, and the like.

One skilled in the art would recognize how to apply fluid property determination components to other systems for stimulating formations (e.g., fracturing systems and acidizing systems) and producing hydrocarbons.

The control system(s) described herein and corresponding computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments of the present application include, but are not limited to, Embodiment A, Embodiment B, and Embodiment C.

Embodiment A is a method comprising: disturbing a surface of a fluid in one or more locations, thereby forming a deformation and waves at the surface of the fluid for the one or more locations; imaging, and measuring at least one selected from the group consisting, of the deformation, the waves, and a combination thereof; and calculating a property of the fluid based on the at least one selected from the group consisting of the deformation, the waves, and a combination thereof, the property selected from the group consisting of viscosity, yield strength, density, and any combination thereof.

Embodiment B is a method comprising: circulating a fluid through a fluid flow path comprising a pump, a wellbore penetrating a subterranean formation, and a fluid property determination component as part of a wellbore operation; disturbing a surface of a fluid in one or more locations while the fluid is in the fluid property determination component, thereby forming a deformation and waves at the surface of the fluid for the one or more locations; imaging and measuring at least one selected from the group consisting of the deformation, the waves, and a combination thereof; and calculating a property of the fluid based on the at least one selected from the group consisting of the deformation, the waves, and a combination thereof, the property selected from the group consisting of viscosity, yield strength, density, and any combination thereof; and changing a parameter of the wellbore operation based on the property of the fluid.

Embodiments A and B may further comprise one or more of the following (unless already provided for): Element 1: the method further comprising: flowing the fluid while disturbing the surface of the fluid; Element 2: the method further comprising: circulating the fluid through a wellbore penetrating a subterranean formation; Element 3: Element 2 and the method further comprising: extracting a sample of the fluid circulating through the wellbore, wherein disturbing the surface is performed on the sample of the fluid; Element 4: circulating the fluid through a fluid circulation system that comprises, in order, a wellbore penetrating a subterranean formation, a fluid cleaning component, a mud pit, and a pump, wherein disturbing the surface of the fluid occurs while the fluid is flowing through the fluid circulation system; Element 5: Element 4 and wherein the steps of disturbing the surface of the fluid, imaging and measuring at least one selected from the group consisting of the deformation, the waves, and the combination thereof, and calculating the property of the fluid is performed between the wellbore and the fluid cleaning component, and wherein the method further comprises: changing a parameter associated with the fluid cleaning component based on the property of the fluid; Element 6: Element 4 and wherein the steps of disturbing the surface of the fluid, imaging and measuring at least one selected from the group consisting of the deformation, the waves, and the combination thereof, and calculating the property of the fluid is performed at the mud pit, and wherein the method further comprises: adding an additive to the fluid before the pump to change the property of the fluid; Element 7: Element 4 and wherein circulating the fluid is part of a wellbore operation, wherein the steps of disturbing the surface of the fluid, imaging and measuring at least one selected from the group consisting of the deformation, the waves, and the combination thereof, and calculating the property of the fluid is performed after the mud pit and before the pump, and wherein the method further comprises: changing a parameter of the wellbore operation based on the property of the fluid; Element 8: wherein disturbing the surface involves impinging the surface of the fluid with a pressurized gas flow; Element 9: Element 8 and wherein the pressurized gas flow increases in strength over time; Element 10: Element 8 and wherein the pressurized gas flow is pulsed; Element 11: wherein disturbing the surface involves impinging the surface of the fluid with two or more pressurized gas flows such that the waves caused by each of the two or more pressurized gas flows generate an interference pattern on the surface of the fluid and wherein the method further comprises: measuring the interference pattern, and wherein calculating the property of the fluid is further based on the interference pattern; Element 12: wherein disturbing the surface involves impinging the surface of the fluid first with a single pressurized gas flow and then with two pressurized gas flows; and Element 13: wherein disturbing the surface involves impinging the surface of the fluid with a solid object. Exemplary combination may include, but are not limited to, Element 1 in combination with one of Elements 8-13; Element 2 and optionally 3 in combination with one of Elements 8-13; Element 4 and optionally one of Elements 5-7 in combination with one of Elements 8-13; Element 1 in combination with Element 4 and optionally one of Elements 5-7; Element 2 and optionally 3 in combination with Element 4 and optionally one of Elements 5-7; and the like. Further, two or more fluid property determination components may be used in different locations along a well system so that the foregoing methods may be performed (1) between the wellbore and the fluid cleaning component, (2) at the mud pit, (3) between the fluid cleaning component and the pump, or any other suitable location. The method performed at each location may be the same or different.

Embodiment C is a system comprising: a wellbore penetrating a subterranean formation; a fluid contained in a fluid flow path; a fluid flow path comprising a pump fluidly coupled to the wellbore for introducing the fluid into the wellbore; and a fluid property determination component located along the fluid flow path, the fluid property determination component comprising a fluid surface disruption component and an imaging device configured to image at least one selected from the group consisting of a deformation, waves, and a combination thereof to a surface of the fluid produced by the fluid surface disruption components.

Embodiment C may further comprise one or more of the following: Element 14: wherein the fluid flow path further comprises a fluid cleaning component and a mud pit; Element 15: Element 14 and wherein the fluid property determination component is located at the mud pit; Element 16: Element 14 and wherein the fluid property determination component is located between the wellbore and the fluid cleaning component; Element 17: Element 14 and wherein the fluid property determination component is located between the fluid cleaning component and the pump. Exemplary combinations may include Element 14 in combination with two or more of Elements 15-17 when two or more fluid property determination components are included in the system.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
disturbing a surface of a fluid in one or more locations, thereby forming a deformation and waves at the surface of the fluid for the one or more locations;
imaging and measuring at least one selected from the group consisting of the deformation, the waves, and a combination thereof;
extracting depth information from two different views of at least the deformation or the waves by establishing an epipolar geometry between the two different views; and
calculating a property of the fluid based on the at least one selected from the group consisting of the deformation, the waves, and a combination thereof, the property selected from the group consisting of viscosity, yield strength, density, and any combination thereof.

2. The method of claim 1 further comprising:
flowing the fluid while disturbing the surface of the fluid.

3. The method of claim 1 further comprising:
circulating the fluid through a wellbore penetrating a subterranean formation.

4. The method of claim 3 further comprising:
extracting a sample of the fluid circulating through the wellbore, wherein disturbing the surface is performed on the sample of the fluid.

5. The method of claim 1 further comprising:
circulating the fluid through a fluid circulation system that comprises, in order, a wellbore penetrating a subterranean formation, a fluid cleaning component, a mud pit, and a pump, wherein disturbing the surface of the fluid occurs while the fluid is flowing through the fluid circulation system.

6. The method of claim 5, wherein the steps of disturbing the surface of the fluid, imaging and measuring at least one selected from the group consisting of the deformation, the waves, and the combination thereof, and calculating the property of the fluid is performed between the wellbore and the fluid cleaning component, and wherein the method further comprises:
changing a parameter associated with the fluid cleaning component based on the property of the fluid.

7. The method of claim 5, wherein the steps of disturbing the surface of the fluid, imaging and measuring at least one selected from the group consisting of the deformation, the waves, and the combination thereof, and calculating the property of the fluid is performed at the mud pit, and wherein the method further comprises:
adding an additive to the fluid before the pump to change the property of the fluid.

8. The method of claim 5, wherein circulating the fluid is part of a wellbore operation, wherein the steps of disturbing the surface of the fluid, imaging and measuring at least one selected from the group consisting of the deformation, the waves, and the combination thereof, and calculating the property of the fluid is performed after the mud pit and before the pump, and wherein the method further comprises: changing a parameter of the wellbore operation based on the property of the fluid.

9. The method of claim 1, wherein disturbing the surface involves impinging the surface of the fluid with a pressurized gas flow.

10. The method of claim 9, wherein the pressurized gas flow increases in strength over time.

11. The method of claim 9, wherein the pressurized gas flow is pulsed.

12. The method of claim 1, wherein disturbing the surface involves impinging the surface of the fluid with two or more pressurized gas flows such that the waves caused by each of the two or more pressurized gas flows generate an interference pattern on the surface of the fluid and wherein the method further comprises: measuring the interference pattern, and wherein calculating the property of the fluid is further based on the interference pattern.

13. The method of claim 1, wherein disturbing the surface involves impinging the surface of the fluid first with a single pressurized gas flow and then with two pressurized gas flows.

14. The method of claim 1, wherein disturbing the surface involves impinging the surface of the fluid with a solid object.

15. A method comprising:
circulating a fluid through a fluid flow path comprising a pump, a wellbore penetrating a subterranean formation, and a fluid property determination component as part of a wellbore operation;
disturbing a surface of a fluid in one or more locations while the fluid is in the fluid property determination component, thereby forming a deformation and waves at the surface of the fluid for the one or more locations;
imaging and measuring at least one selected from the group consisting of the deformation, the waves, and a combination thereof;
extracting depth information from two different views of at least the deformation or the waves by establishing an epipolar geometry between the two different views;
calculating a property of the fluid based on the at least one selected from the group consisting of the deformation, the waves, and a combination thereof, the property selected from the group consisting of viscosity, yield strength, density, and any combination thereof; and
changing a parameter of the wellbore operation based on the property of the fluid.

16. A system comprising:
a wellbore penetrating a subterranean formation;
a fluid contained in a fluid flow path;
a fluid flow path comprising a pump fluidly coupled to the wellbore for introducing the fluid into the wellbore; and
a fluid property determination component located along the fluid flow path, the fluid property determination component comprising a fluid surface disruption component;
at least two imaging devices disposed at different vantage points, each imaging device configured to image at least one selected from the group consisting of a deformation, waves, and a combination thereof of a surface of the fluid produced by the fluid surface disruption components, the fluid property determination component configured to determine a property of the fluid based on the deformation, the waves, or the combination thereof, the property of the fluid selected from the group consisting of viscosity, yield strength, density, and any combination thereof; and a controller configured to extract depth information from two different views of at least the deformation or the waves by establishing an epipolar geometry between the two different views.

17. The system of claim 16, wherein the fluid flow path further comprises a fluid cleaning component and a mud pit.

18. The system of claim 17, wherein the fluid property determination component is located at the mud pit.

19. The system of claim 17, wherein the fluid property determination component is located between the wellbore and the fluid cleaning component.

20. The system of claim 17, wherein the fluid property determination component is located between the fluid cleaning component and the pump.

* * * * *